Jan. 3, 1950  W. NELSON  2,493,013
AIRPLANE LAUNCHING DEVICE
Filed Aug. 20, 1940  3 Sheets-Sheet 1

INVENTOR
WILLIAM NELSON
BY
ATTORNEY

Jan. 3, 1950 W. NELSON 2,493,013
AIRPLANE LAUNCHING DEVICE

Filed Aug. 20, 1940 3 Sheets-Sheet 2

INVENTOR
WILLIAM NELSON
BY
ATTORNEY

Jan. 3, 1950 W. NELSON 2,493,013
AIRPLANE LAUNCHING DEVICE
Filed Aug. 20, 1940 3 Sheets-Sheet 3

INVENTOR
WILLIAM NELSON
BY
ATTORNEY

Patented Jan. 3, 1950

2,493,013

UNITED STATES PATENT OFFICE 2,493,013

AIRPLANE LAUNCHING DEVICE

William Nelson, United States Navy

Application August 20, 1940, Serial No. 353,399

9 Claims. (Cl. 244—63)

(Granted under the act of March 3, 1883, as amended April 30, 1928; 370 O. G. 757)

This invention relates to an airplane launching device and has for an object to provide an improved means of assisting airplanes in being launched in a limited area.

A further object of this invention is to provide an airplane launching or catapulting device wherein the power of the airplane engine is assisted by a fluid turbine during takeoff so as to provide additional power in order to assist the airplane in getting off the ground surface.

A further object of this invention is to provide a fluid turbine catapult for airplane takeoff utilizing expansive power of any compressed fluid such as compressed air, high pressure steam, water, or other gas or liquid having either a natural or transmitted pressure for actuating turbine blades.

A further object of this invention is to provide an improved carriage on which the airplane is carried during the launching process, and to provide a turbine actuated means for quickly accelerating the carriage while carrying the airplane until it is launched and for then even more quickly braking the carriage to a stop after the airplane has taken off therefrom.

A further object of this invention is to provide a means for holding the carriage against movement while the airplane motor is being warmed up and then for simultaneously releasing the carriage from such holding means and giving it an initial impetus so as to start it moving and allow the turbine to be actuated by the fluid already provided under pressure.

A further object of this invention is to provide an airplane supporting carriage which is operated along a lineal turbine having stationary turbine blades for directing the pressure fluid against the turbine blades of the carriage and further provide valve means for releasing the pressure fluid from the pressure line to the turbine blades only while the turbine blades of the carriage are in a position to be effected thereby, and to provide a cam means carried by the carriage for actuating the fluid at the proper time.

A still further object of this invention is to provide rotatably mounted turbine blades on the launching carriage and a means on the carriage for automatically rotating such blades so that when they are placed in a carriage propelling direction at the beginning of the runway they will be rotated to a carriage retarding or braking position just as or after the airplane is launched therefrom.

With the foregoing and other objects in view, the invention consists in the construction, combination and arrangement of parts hereinafter described and illustrated in the drawing, in which.

Figure 1:
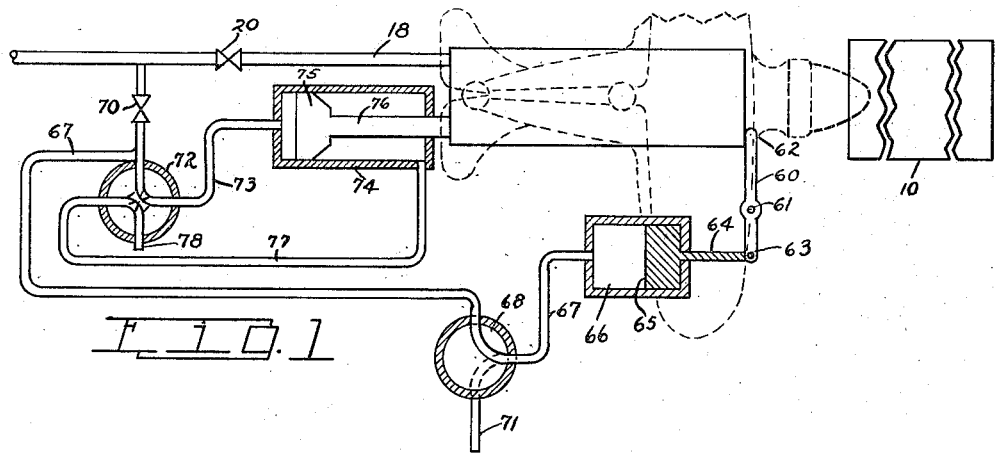
Fig. 1 is a schematic view of the airplane launching mechanism with the airplane carried in battery position ready to be started on its launching run.
Figure 2:
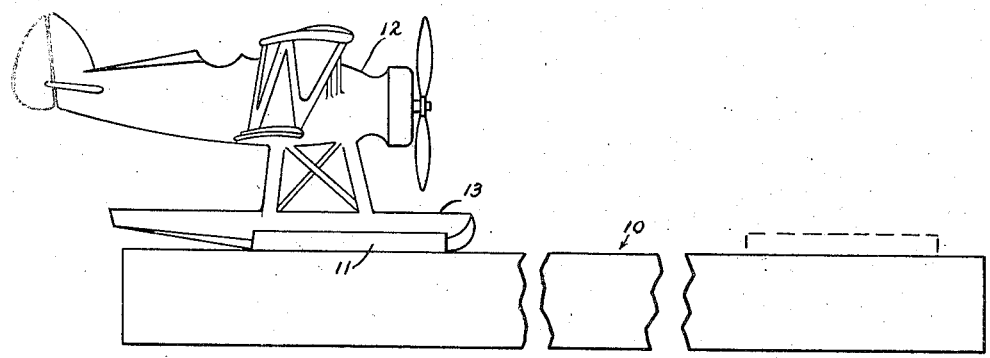
Fig. 2 is a side elevation of the turbine runway with the airplane in position on the carriage thereon.
Figure 3:
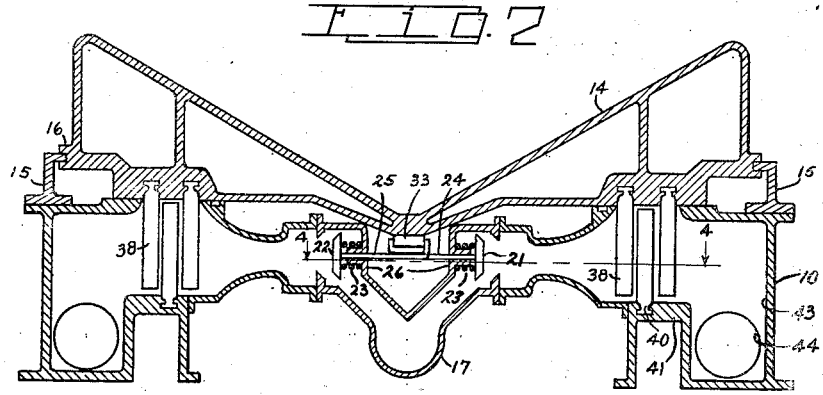
Fig. 3 is a sectional view through the airplane carriage and the track and turbine.
Figure 5:
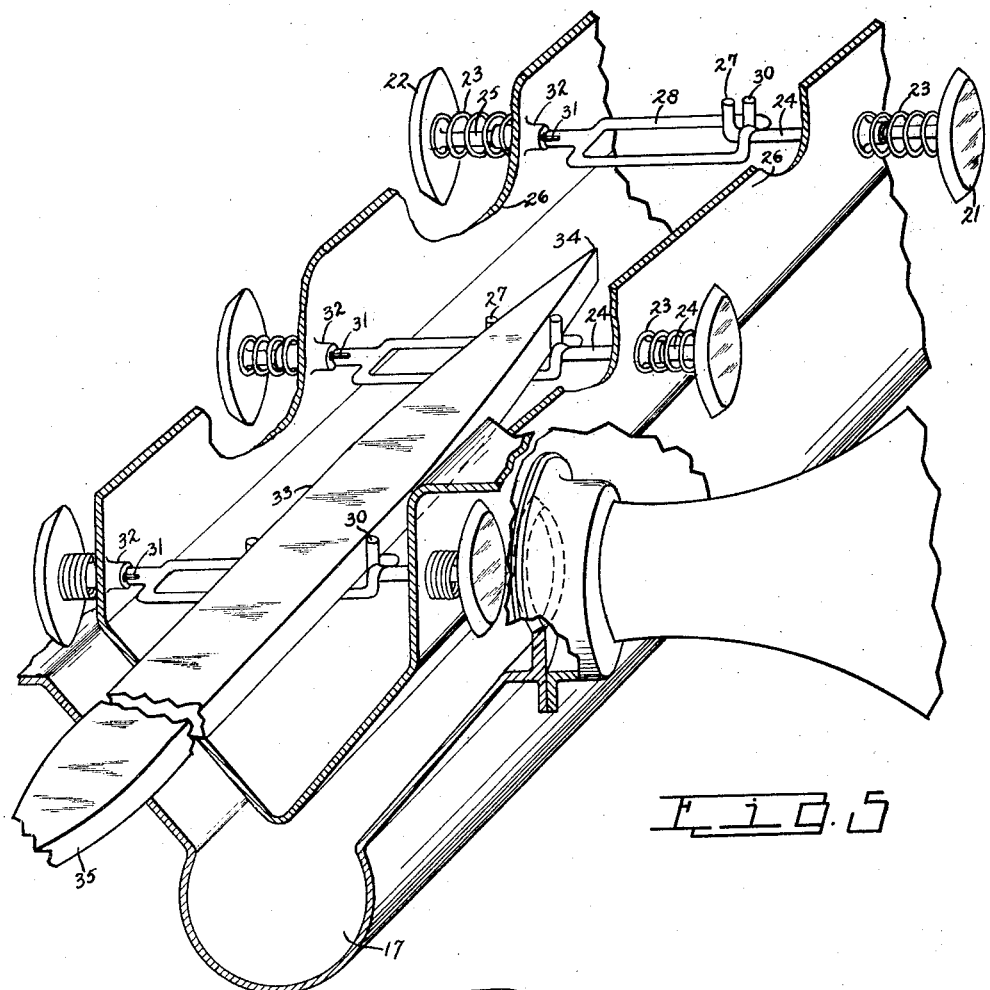
Fig. 5 is a perspective view of the turbine valve and valve actuating mechanism.

There is shown at 10 the launching track or runway on which is to be actuated the launching carriage 11 for carrying any suitable type of airplane 12 here shown as a seaplane having pontoons 13 fitted on the carriage 11 but obviously any type of airplane where the seaplane, land plane or amphibian may be used, the airplane supporting bed 14 being made suitable for the particular aircraft to be launched thereby.

The runway 10 includes a pair of tracks 15 cooperating with slippers 16 on the carriage for slidably supporting the carriage thereon, although it will be understood that suitable guiding wheels may be substituted therefor. The runway 10 includes a fluid pressure conduit 17 which receives its fluid pressure from a pressure line 18 controlled by cutoff valve 20, although any type of fluid pressure may be used. High pressure steam is probably the preferred form and the description herein will probably refer to steam, it being understood that any other fluid pressure may be substituted therefor. Steam going from the line 18 passes into pressure conduit 17. This conduit 17 is provided with a great number of oppositely disposed poppet valves 21 and 22 normally held in closed position by both the steam pressure and by compression coil springs 23 extending about valve stems 24 and 25 between the conduit walls 26 and the back of the valves 21 and 22.

The valve stem 24 terminates in an upstanding finger 27 which extends inside of a loop 28 formed on its paired valve stem 25. This loop 28 also terminates in an upstanding finger 30, which it will be noted extends over the stem 24. The fingers 27 and 30 are spaced apart, it being observed that the finger 27 is nearer to its paired valve 22 and correspondingly finger 30 is nearer its paired valve 21. To insure that the fingers 30 and 27 remain in vertical position, a suitable guiding spline such as 31 and corresponding groove may be provided within each of the bosses 32 in the walls 26 through which the valve stems 24 and 25 extend. As will be apparent from Fig. 4, the valves 21 and 22 are moved to open position as their fingers 27 and 30 are moved so as to increase the space therebetween. This action is caused by passing a boat-shaped cam 33 therebetween, a wedge shaped bow 34 passing into the space between the fingers 27 and 30 to gradually open them against the pressure of the steam and the compression springs and holding them open while the main body of the cam 33 passes thereby, and allowing them to close gradually as the wedge shaped stern 35 of the cam 33 passes therethrough with the steam and compression springs 25 causing the closing action. This cam 33 may be thoroughly greased or lubricated to reduce friction as it passes through the successive pairs of valve stem tongues on the runway.

This valve actuating cam 33 is inherently supported by and attached to the bottom of the carriage 11. As each valve 21 and 22 is successively opened it permits steam from the steam conduit 17 to escape through the opening in the valve seat 36 and to continue passing through the valve as long as the cam 33 is in the valve opening position. The steam passing the valve enters the respective nozzles 37 and is deflected against a series of appropriately positioned turbine blades 38 mounted on the bottom of the carriage 11, the nozzle 37 and the blades 38 being so directed as to cause the maximum reaction against the blade and thus move the carriage 11 along the runway 10.

In order to utilize the steam pressure as efficiently as possible, a plurality of turbine blades is provided, there being a series of stationary blades 40 mounted in the runway base 41 and then a second series of movable blades 42 also mounted on the bottom of the carriage 11. If desired, for further efficiency, additional series of turbine blades may be utilized on the carriage and on the runway. After passing through the various series of turbine blades, the steam escapes to the exhaust conduit 43, whence it is discharged through an outlet 44 to a suitable condenser or to the atmosphere. As will be observed, this mechanism of the valve, nozzle and turbine blades is duplicated on opposite sides of the runway identically except for the difference in the valve stem, as already described.

Figure 4:
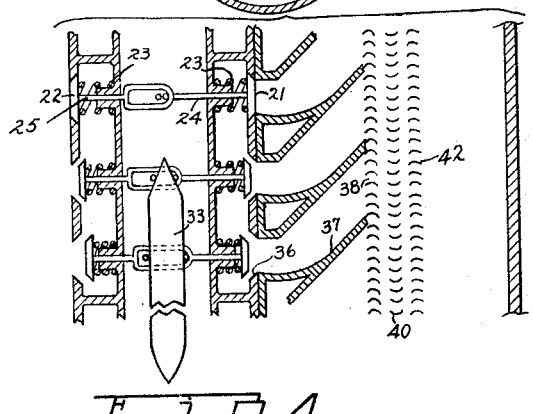
Fig. 4 is a sectional view of the turbine and valve mechanism on line 4—4 of Fig. 3.
Figure 7:
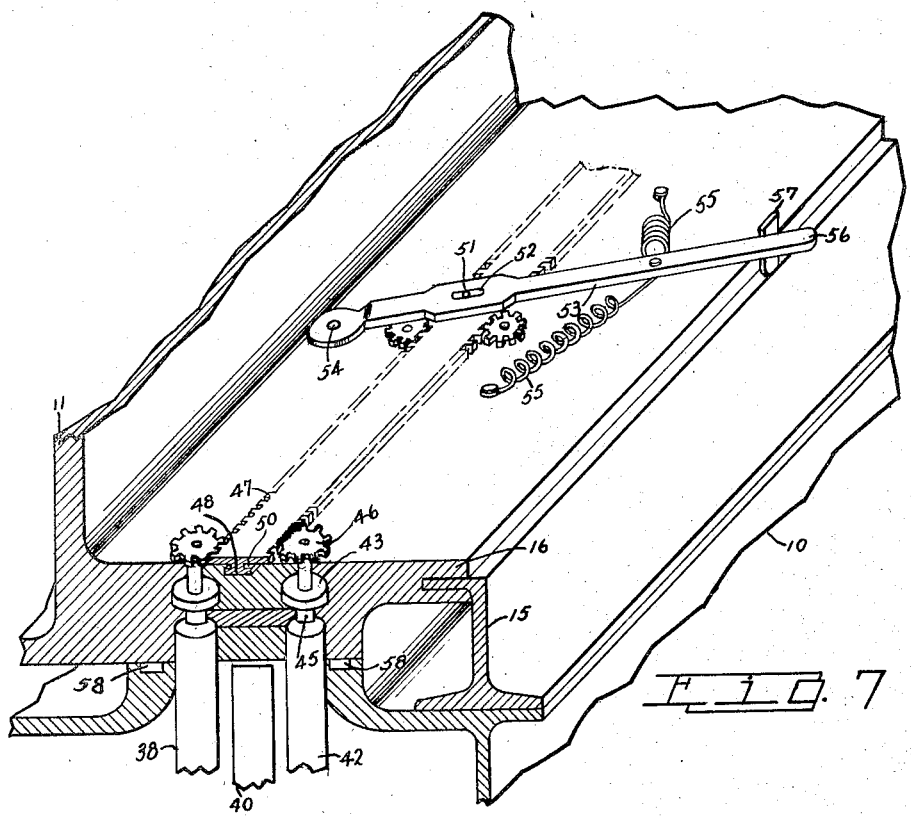
Fig. 7 is a perspective view of the mechanism of Fig. 6.
Figure 6:
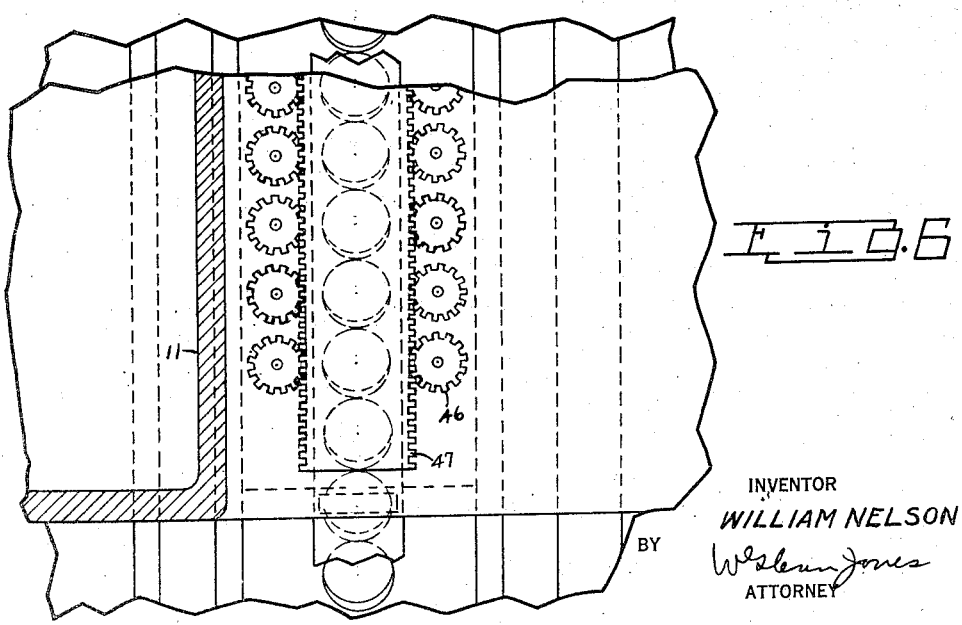
Fig. 6 is a partly fragmentary plan view of the carriage and of the carriage turbine blade rotating mechanism.

While the carriage turbine blades 38 and 42 may be fixed in the direction indicated in Fig. 4, they are preferably rotatably mounted as brought out in Figs. 6 and 7, whereby they may be rotated 180° so that when they reach a certain point in the runway at which point the airplane 12 will have been launched from the carriage 11, the steam pressure may thereafter assist in braking or retarding the carriage preparatory to its being returned to initial position for launching another airplane. Each turbine blade 38 and 42 is provided with a bearing 43 journaled in the bottom 44 of the carriage 11 and has a shaft 45 extending through the bottom 44 and terminating in the cog-wheel 46 meshed with the teeth of a rack 47. This rack 47 is provided with a T base 48 extending into a corresponding T slot 50 in the carriage bottom 44 so as to slidably guide the rack 47. This rack 47 is provided with a pin 51 extending into a slot 52 of a lever 53 pivoted to the carriage bottom as at 54, and provided with tension springs 55 anchored thereto and to the carriage bottom so as to keep the lever 53 to one side or the other of dead center.

The lever 53 is provided with an extending arm 56 adapted to abut against a stop 57 suitably located along the length of each track 15 at the position along the runway 10 where it is desired to rotate the blades 38 and 42 and assist in retarding the carriage 11, the distance between the slot 52 and the lever pivot 54 being just sufficient so that the motion of the rack 47 will just rotate the cogs 46 the necessary amount to reverse the direction of the turbine blades 38 and 40. It will be further understood that beyond the stop 57 the fixed blades 40 will be fixed in the opposite direction to that shown in the portion 44. Suitable glands 58 are provided between the carriage bottom 44 and the turbine path so as to prevent loss of pressure of the live steam while the carriage is passing thereover.

In order to quickly initiate the movement of the carriage 11, a suitable mechanism such as is schematically shown in Fig. 1, is provided. This includes a holdback lever 60 pivoted at 61 having one end 62 held in the path of the carriage 11 while its other end 63 is held by a rod 64 extending from a piston 65 within a steam cylinder 66 connected by a steam line 67 through a three-way valve 68 and a cut-off valve 70 to the steam supply line 18.

The three-way valve 68 when in the position shown in full in Fig. 1 with the cut-off valve 70 opened supplies the full steam pressure against the back of the valve piston 65, thus holding the carriage 11 against movement. When the valve 68 is rotated 90° in the clockwise direction to the dotted line position the cylinder 66 is connected to a vent 71, thus cutting off the steam supply through the cylinder 66 and permitting the steam already therein to escape through the vent 71, thus permitting the holdback lever 60 to be rotated to carriage releasing position.

The steam line 67 also connects to a four-way valve 72. This valve 72 in the full line position connects the steam line 67 to a steam line 73 leading to a cylinder 74 within which is located a movable piston 75. The area of this piston is somewhat less than the area of the piston 65. Extending from the back of piston 75 is a heavy pusher rod 76 which extends outside the cylinder 74 and abuts the back of the carriage 11. Extending from the cylinder 74 on the side of the piston 75 from which the pusher rod 76 extends is a steam line 77 connecting back to the four-way valve 72 and through the valve 72 to a vent 78.

In operation, the airplane 12 is placed on the carriage 11 at the beginning of the runway 10. In order to launch or catapult this airplane 12 the cut-off valves 20 and 70 are both opened, permitting inlet 17 to be filled with steam of suitable high pressure. Three-way valve 68 and the four-way valve 72 are each in the full line position shown in Fig. 1, whereby the full steam pressure is against the back of the piston 65, holding the carriage against movement while the steam pressure in cylinder 74 is against the piston 75 which, being of less area than the area of the piston 65, cannot yet move. The motor of the airplane 12 may be thoroughly warmed up, suitable conventional mechanism, not shown, being provided on the carriage 11 to prevent the airplane 12 from moving off the carriage 11 until after the airplane and carriage have moved a suitable distance down the runway 10. After the motor is thoroughly warmed up the three-way valve 68 is rotated 90°, thus permitting the steam in cylinder 66 to escape through vent 71 and relieving the pressure on the holdback lever 60. The steam in cylinder 74 then moves the piston 75 to actuate the pressure ram 76 against the back of the carriage 11, thus giving it a quick start. The carriage 11 with the airplane 12 supported thereon is thereby started down the runway 10 at a rapid rate. The cam 33 than passes between the paired valve stem fingers 27 and 30, opening the valves from conduit 17 to the nozzle 37 and then to the series of turbine blades, thus rapidly accelerating the carriage 11 until the airplane is moving at a flying speed, at which time it leaves the carriage 11 and commences its flight. At or shortly after this point the carriage 11 reaches the position at which the lever 53 hits the stop 57, reversing the direction of the turbine blades 38 and 42 and thus causing the steam pressure to assist in braking or retarding the carriage 11.

The carriage 11 is then returned to the initial or battery position by any suitable means such as a cable or the like, the cut-off valve 20 having been first closed to prevent any steam pressure from resisting its return movement. The four-way valve 72 is rotated 90° in a clockwise direction, permitting the steam in cylinder 74 in front of piston 75 to be connected to the vent 78 while line 67 is connected through valve 72 and steam line 77 to the opposite side of piston 75, thus returning the piston to the initial or battery position. When the carriage 11 is in its initial position the three-way valve 68 is then restored to the full line position with the hold back lever 60 in operating position, thus causing the cylinder 66 to move to the position for holding the holdback lever 60 in such operating position. Thereafter another airplane 12 may be placed on the carriage 11, the four-way valve 72 restored to the full line position, and the check valve 20 opened again, making the launching device ready to repeat its cycle of operations and launching the airplane now in position thereon.

Other modifications and changes in the proportions and arrangements of the parts may be made by those skilled in the art without departing from the nature and scope of the invention, as defined in the appended claims.

The invention described herein may be manufactured and/or used by or for the Government of the United States of America for governmental purposes without the payment of any royalties thereon or therefor.

Having thus set forth and disclosed the nature of this invention, what is claimed is:

1. An aircraft catapult comprising an aircraft carriage, a launching runway, and a cooperative linear turbine blading arrangement means on said carriage and in said runway, said cooperative turbine means comprising a plurality of linear turbine blades on said carriage, and a plurality of fixed turbine blades extending linearly along said runway, said turbine blades on said carriage being rotatable from a carriage advancing direction to a carriage retarding direction.

2. An aircraft catapult comprising an aircraft carriage, a launching runway, and a cooperative linear turbine blading arrangement means on said carriage and in said runway, said cooperative turbine means comprising a plurality of linear turbine blades on said carriage, a plurality of fixed turbine blades extending linearly along said runway, said turbine blades on said carriage being rotatable from a carriage advancing direction to a carriage retarding direction, and means for automatically changing the direction of said turbine blades when said carriage has reached a predetermined point on said runway.

3. An aircraft catapult comprising an aircraft carriage, a launching runway, and a cooperative turbine means on said carriage and in said runway, said cooperative turbine means comprising a plurality of turbine blades on said carriage, a plurality of fixed turbine blades extending along said runway, said turbine blades on said carriage being rotatable from a carriage advancing direction to a carriage retarding direction, means for automatically changing the direction of said carriage turbine blades when said carriage has reached a predetermined point on said runway, said means comprising a shaft on each carriage turbine blade, a cogwheel on said shaft, a rack meshed with said cogwheel and movably mounted on said carriage, and lever means connected to said rack for moving said rack when said lever means is moved.

4. An aircraft catapult comprising an aircraft carriage, a launching runway, and a cooperative linear turbine blading arrangement means on said carriage and in said runway, said cooperative turbine means comprising a plurality of linear turbine blades on said carriage, a plurality of fixed turbine blades extending linearly along said runway, and a fluid pressure conduit along said runway and cooperative means on said carriage and in said fluid pressure conduit for releasing the fluid pressure in said conduit to said cooperating turbine means as said carriage passes along the runway.

5. An aircraft catapult comprising an aircraft carriage, a launching runway, and a cooperative linear turbine blading arrangement means on said carriage and in said runway, said cooperative turbine means comprising a plurality of turbine blades on said carriage, a plurality of fixed turbine blades extending linearly along said runway, a fluid pressure conduit along said runway and cooperative means on said carriage and in said fluid pressure conduit for releasing the fluid pressure in said conduit to said cooperating turbine means as said carriage passes along the runway, said cooperating means comprising a series of self-closing valves in said fluid pressure conduit, and cam means on said carriage for opening only such of said valves as are in the vicinity of the carriage as it passes along said runway.

6. An aircraft catapult comprising an aircraft carriage, a launching runway, and a cooperative turbine means on said carriage and in said runway, said cooperative turbine means comprising a plurality of turbine blades on said carriage, a plurality of fixed turbine blades extending along said runway, a fluid pressure conduit and cooperative means on said carriage and in said fluid pressure conduit for releasing the fluid pressure in said conduit to said cooperating turbine means as said carriage passes along the runway, said cooperating means comprising a series of self-closing valves in said fluid pressure conduit, and cam means on said carriage for opening only such of said valves as are in the vicinity of the carriage as it passes along said runway, said valves being paired, the valves of each pair extending in opposite directions from each other, valve stems on said pair of valves extending toward each other and angular fingers extending from each valve stem, said angular finger of each valve stem being nearer to the other valve than the angular finger of that valve and being slightly spaced from the first angular finger, whereby said cam means may pass between said valve fingers to open said valves.

7. An aircraft catapult comprising an aircraft carriage, a launching runway, and a cooperative turbine means on said carriage and in said runway, pressure actuated holdback means for preventing movement of said carriage at initial position on said runway and pressure actuated pusher ram means behind said carriage for imparting an initial impetus to said carriage, the total pressure on said holdback means being greater than the total pressure on said pusher ram means.

8. An aircraft catapult comprising an aircraft carriage, a launching runway, and a cooperative turbine means on said carriage and in said runway, pressure actuated holdback means for preventing movement of said carriage at initial position on said runway, pressure actuated pusher ram means behind said carriage for imparting an initial impetus to said carriage, the total pressure on said holdback means being greater than the total pressure on said pusher ram means, and valve means to said holdback pressure means and venting same permitting the pressure on said pusher ram means to initially actuate said carriage.

9. An aircraft catapult comprising an aircraft carriage, a launching runway, and a cooperative turbine means on said carriage and in said runway, pressure actuated holdback means for preventing movement of said carriage at initial position on said runway, and pressure actuated pusher ram means behind said carriage for imparting an initial impetus to said carriage, the total pressure on said holdback means being greater than the total pressure on said pusher ram means, valve means to said holdback pressure means for disconnecting the pressure to said holdback pressure means and venting the same, permitting the pressure on said pusher ram means to initially actuate said carriage, and a four-way valve to said pusher ram means pressure line leading through said pressure valve to both sides of said pusher ram means, whereby said pusher ram means may be pressure actuated in either direction.

WILLIAM NELSON.

REFERENCES CITED

The following references are of record in the file of this patent:

UNITED STATES PATENTS

| Number | Name | Date |
|---|---|---|
| 1,304,287 | Emmet | May 20, 1919 |
| 1,411,597 | Trask | Apr. 4, 1922 |

FOREIGN PATENTS

| Number | Country | Date |
|---|---|---|
| 470,767 | Great Britain | Aug. 20, 1937 |